March 22, 1938.     W. V. JOHNSON     2,112,098
VARIABLE TIME CHARACTERISTIC RELAY
Filed June 17, 1936     2 Sheets-Sheet 1

WITNESSES:
Michael Stork
G. O. Harrison

INVENTOR
Welton V. Johnson.
BY
ATTORNEY

March 22, 1938.        W. V. JOHNSON        2,112,098
VARIABLE TIME CHARACTERISTIC RELAY
Filed June 17, 1936        2 Sheets-Sheet 2
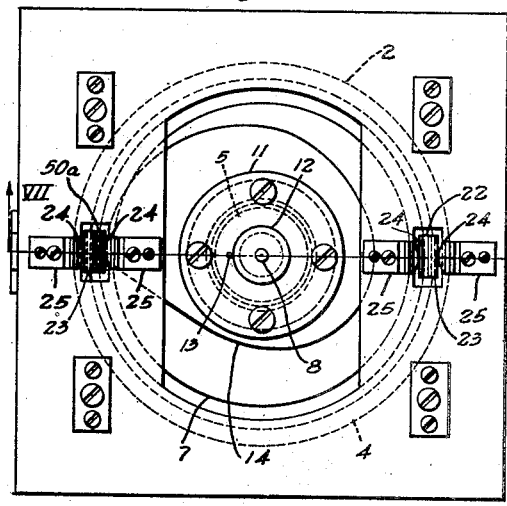
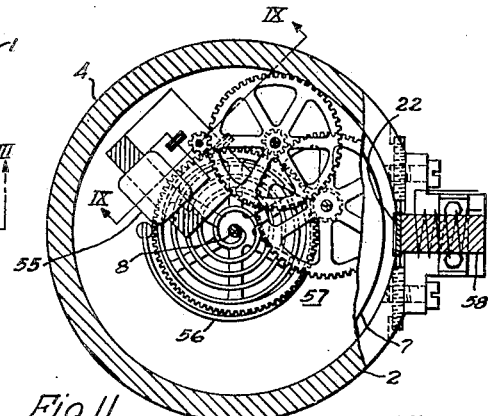
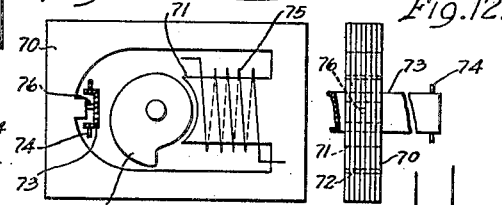
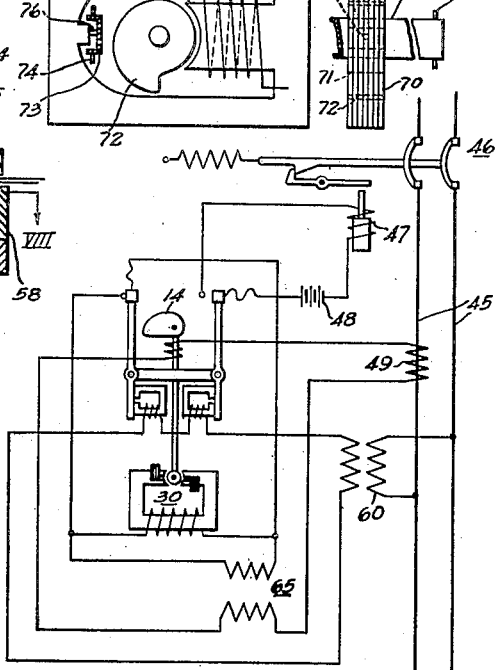
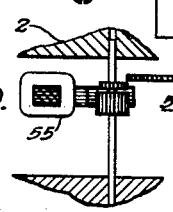
WITNESSES:
INVENTOR
Welton V. Johnson.
BY
ATTORNEY Patented Mar. 22, 1938

2,112,098

UNITED STATES PATENT OFFICE 2,112,098

VARIABLE TIME CHARACTERISTIC RELAY

Welton V. Johnson, East Orange, N. J., assignor to Westinghouse Electric & Manufacturing Company, East Pittsburgh, Pa., a corporation of Pennsylvania Application June 17, 1936, Serial No. 85,634

9 Claims. (Cl. 175—294)

My invention relates to protective relays for electrical circuits and apparatus and particularly to such relays which operate with a variable time delay dependent upon the magnitude of an electrical condition. Although not limited thereto, my invention is particularly applicable to overcurrent and distance relays for general protective purposes in alternating current systems of transmission and distribution.

Various relays have heretofore been proposed for such applications, which involve a fault responsive element such as an induction disc motor, and a constant speed element, such as a clock mechanism or synchronous motor, arranged to control the relative movement of a pair of cooperating contacts. The induction disc element may be spring biased to produce a variable deflection or may operate at variable speed against the drag of a permanent magnet, and the mechanical arrangement for operating the contacts may assume any of a number of forms, dependent upon the time characteristics required.

Although many such arrangements provide theoretical characteristics of highly desirable form, it is usually impossible to realize these characteristics in practice because of mechanical limitations of the arrangement. A common difficulty is that the contact movement required for minimum time operation is excessive, resulting in either a high minimum operating time or inaccuracy of timing at the shorter time intervals because of mechanical oscillations. Either deficiency precludes use of the relay for high-speed applications and imposes undesirable restrictions on its use for other purposes.

It is an object of my invention to provide a novel variable time characteristic relay which will follow any desired time characteristic of a line variable with uniform accuracy at all points and will provide a substantially instantaneous minimum operating time.

Other objects of my invention will become evident from the following detailed description taken in conjunction with the accompanying drawings, in which:

Fig. 6 is a plan view of an impedance relay embodying my invention;

Fig. 7 is a sectional view taken on the line VII—VII of Fig. 6;

Fig. 8 is a sectional view taken on the line VIII—VIII of Fig. 7;

Fig. 9 is a fragmentary sectional view taken on the line IX—IX of Fig. 8, showing a detail of the timing motor;

Fig. 10 is a diagrammatic view of an impedance protective system embodying the relay of Fig. 6;

Fig. 11 is a plan view of an improved magnetic circuit for the relay of Figs. 1 to 4; and Fig. 12 is a view in end elevation of the magnetic circuit shown in Fig. 11.

Figure 1:
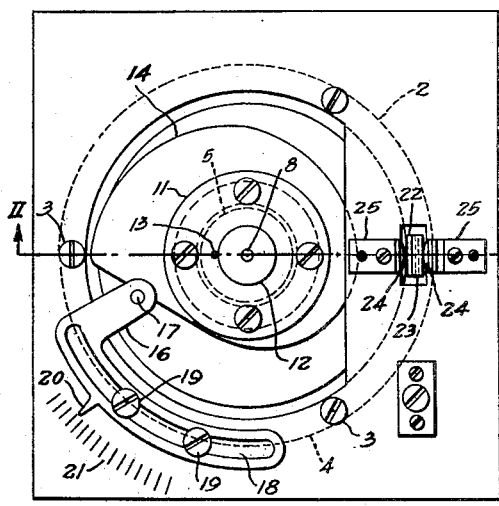
Figure 1 is a plan view of an overcurrent relay embodying my invention.
Figure 3:
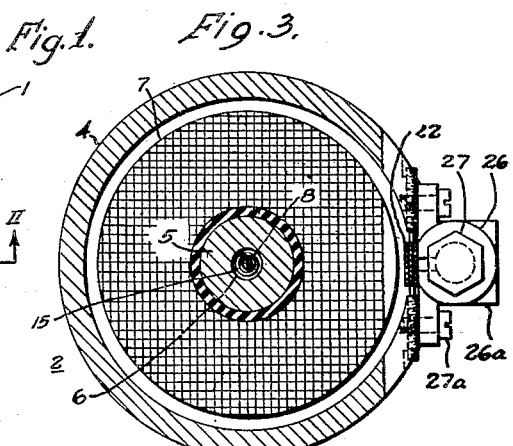
Fig. 3 is a sectional view taken on the line III—III of Fig. 2.
Figure 2:
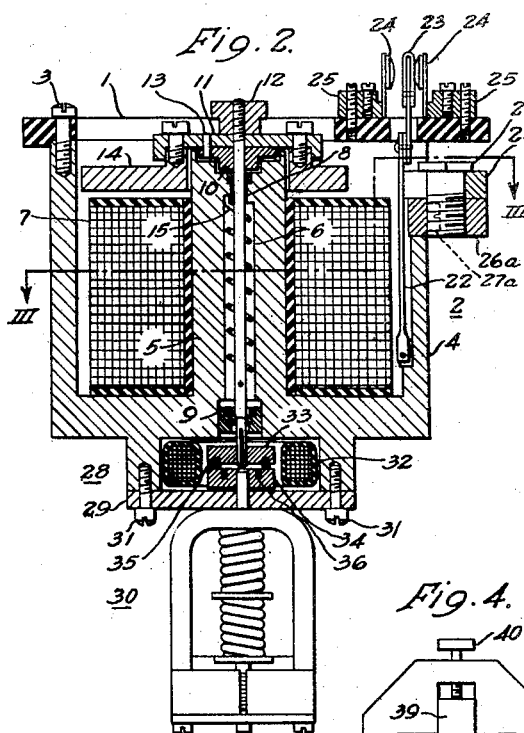
Fig. 2 is a sectional view taken on the line II—II of Fig. 1.

Referring to Figs. 1, 2 and 3, which show an adaptation of the invention for over-current protection, a base plate 1, of suitable insulating material, is secured to a magnetic structure 2, by means of suitable bolts 3 to constitute an enclosure therewith for the operating parts of the relay. The magnetic structure 2 comprises an outer shell portion 4 and a core portion 5 arranged to constitute an iron-clad type magnetic circuit for the relay coil 7.

The core portion 5 is drilled at 6 to form a recess, in which a shaft 8 is rotatably mounted by means of suitable bearings 9. The shaft 8 carries a yoke 10, splined or otherwise suitably secured thereto, to rotate therewith, and a circular plate 11 is secured to the yoke 10 by means of a thumb nut 12 and a pin 13. A movable magnetic element for cooperation with the magnetic structure 2, preferably in the form of a cam 14, is secured to the circular plate 11 by any suitable means, so as to form a variable air gap with the shell portion 4. A helical spring 15 is mounted within the recess 6 and arranged to bias the shaft 8 to an initial position against an adjustable member 16 provided with a depending stop pin 17.

The adjustable member 16 may be a sheet metal member provided with an arcuate slot 18, and adjustably secured to the base plate 1 by suitable fastening members, such as machine screws 19. The adjustable member 16 is provided with a pointer or index 20 which cooperates with a stationary scale 21 upon the base plate 1. Obviously, various equivalent adjustments known in the art may be substituted for the specific structure shown.

A movable magnetic operating member is mounted in the air gap between the magnetic cam 14 and the shell portion 4 of the magnetic structure 2. The operating member may assume any of a number of forms, but preferably comprises a pivoted armature 22 of magnetic material, mounted so as to rotate in a plane passing through the axis of the shaft 8. The armature 22 is provided with a movable contact 23 which cooperates with suitable stationary contacts 24. Conducting terminals 25 are mounted on the base plate 1 and may be connected with the stationary contacts 24 and moving contact 23 in well known manner. The form of contact structure used, of course, is susceptible to many variations familiar to those skilled in the art.

A suitable biasing or restraining element for the magnetic armature 22 is provided for maintaining the latter in an initial position, in which the back contact circuit of the relay is completed, and the front contact circuit is open. The restraining element preferably comprises a permanent magnet 26 secured to a bracket 26a by means of a bolt 27. The bracket 26a may be secured to the shell portion of the magnetic structure 2 by means of suitable machine screws 27a. A permanent magnet is preferred for this purpose for the reason that its biasing or restraining force substantially disappears upon the slightest movement of the armature, so that the latter movement is fast and positive.

The magnetic cam 14 is provided with a graduated periphery, preferably of generally spiral contour, so as to provide a variable air gap in the magnetic circuit comprising the shell portion 4, the core portion 5 and the cam 14. Upon rotation of the cam 14, the variable air gap varies the reluctance of the magnetic circuit, and thereby varies the attractive force acting upon the armature 22 and tending to move the latter from its initial position to its operating position.

The lower portion of the magnetic structure 2 is recessed to provide a chamber for a clutch assembly 28. The clutch assembly 28 is preferably enclosed by means of a magnetic cover plate 29, which also serves as the base plate of an adjustable speed motor 30. The cover plate 29 is secured in place over the clutch assembly 28 by any suitable means, such as bolts 31. The clutch assembly 28 comprises a coil 32, mounted within the enclosure, in position to surround a magnetic driving plate 33, loosely splined to the shaft 8, and a driven plate 34, which is rigidly secured to the shaft of the motor 30. The driving plate 33 is provided with a suitable facing 35, of resilient material, which extends outward slightly from the face thereof and is compressed flush with the latter upon a clutching operation of the assembly. A copper lag loop 36 is set in the face of the driven plate 34, to provide quadrature flux during operation of the clutch, to thereby prevent release of the clutch at the zero points of magnetization. The clutch assembly 28 permits rapid return of the cam 14 to its initial position upon de-energization of the relay, to thereby prepare the relay for a subsequent operation. During return movement of the cam 14, the driving plate 33 slides loosely over the driven plate 34.

The adjustable speed motor 30 may be of any suitable type, but is preferably a vibrator type polarized motor, such as described in my copending application, Serial No. 85,635, filed June 17, 1936, and assigned to the Westinghouse Electric & Manufacturing Company. As the specific structure of the motor 30 forms no part of the present invention, a detailed description thereof is omitted. It will be understood, however, that the motor 30 when energized from a suitable alternating-current source, operates at a constant adjustable speed in the direction corresponding to the clockwise direction of Fig. 1.

Figure 5A:
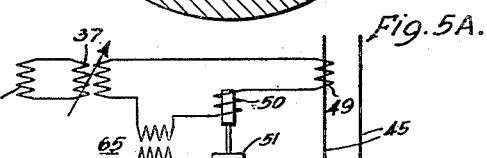
Fig. 5a is a diagrammatic view of a modification of the relay energizing circuits of the protective system shown in Fig. 5.
Figure 4:
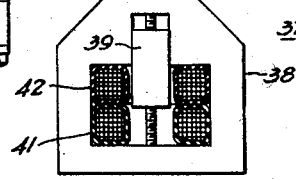
Fig. 4 is an elevational view of a preferred form of current transformer to be used in the practice of my invention.

Fig. 4 shows an adjustable auxiliary transformer 37, of a preferred type for use in the over-current protective circuit which will be hereinafter described in connection with Fig. 5a. The auxiliary transformer 37 comprises an outer shell of magnetic material 38, preferably laminated in well known manner, and recessed to receive a sliding core 39. The sliding core 39 is mounted on an adjusting bolt 40 for movement centrally with reference to the outer shell 38. A stationary primary winding 41 and a stationary secondary winding 42 are mounted within the shell portion 38 in position to surround the core 39. Upon adjustment of the position of the core 39 by means of the adjusting bolt 40, the flux distribution within the magnetic core is changed so that the mutual reactance of the auxiliary transformer may be increased while the transformer leakage reactance is decreased, or vice versa. In this way the secondary current of the transformer, for constant primary current and a load of constant impedance and impedance phase angle, may be varied through a considerable range of values. I have found in practice that secondary voltage variations of the order of 6 to 1 can be secured with all intermediate graduations, by means of this device.

Figure 5:
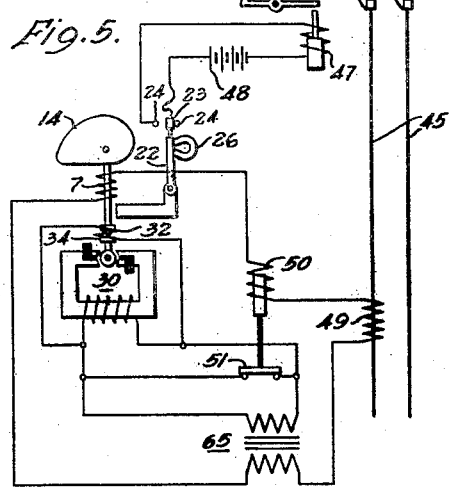
Fig. 5 is a diagrammatic view of an over-current protective system embodying the relay of Fig. 1.

Fig. 5 shows the electric circuits associated with the relay shown in Figs. 1, 2 and 3, for use in the protection of an alternating-current power circuit against over-currents. In Fig. 5, the alternating-current power circuit, which may be a transmission or distribution feeder, is denoted by the reference numeral 45, and a circuit breaker 46, of any suitable type is provided for interrupting the current flow in the event of a fault. The circuit breaker 46 is provided with the usual trip coil 47, which is connected in circuit with a suitable source of power, such as a battery 48, and the front contacts of the relay, shown diagrammatically at the left of the figure.

A line current transformer 49 is provided and connected with its secondary winding in series with an initiating element 50, the coil 7 of the relay and the primary winding of the saturable transformer 65. The initiating element 50 is provided with back contact members 51, which are connected in parallel with the secondary winding of a saturable transformer 65, the energized winding of motor 30 and the winding 32 of the relay clutch. With this arrangement, the contacts 51 normally short circuit the secondary circuit of the saturable transformer 65, and prevent the circulation of current through the energizing winding of the motor 30 and the clutch coil 32.

The initiating element 50, although shown separate from the relay proper, may be a part of the relay, as will be hereinafter explained in connection with Figs. 6 to 10. The initiating element 50 is adjusted or designed to respond to the minimum value of fault current of the power circuit 45, at which an operation of the circuit breaker 46 is required. The magnetic cam 14 is positioned by means of its adjustable stop (shown in Fig. 1) to a position in which the air gap between the cam 14 and the armature 22 is of such magnitude as to require the maximum over-current value of the current in the power circuit 45 to exist for operation of the armature 22. By adjusting the initial position of the cam 14, this value may be arbitrarily fixed at any point in a comparatively large range.

The operation of the apparatus shown in Fig. 5 may be set forth as follows: Assuming that the current in the alternating-current power circuit 45 is within normal limits, the initiating element 50 remains closed, thereby preventing energization of the motor 30 and clutch 28. Upon the occurrence of a fault in the power circuit 45, the current rises to a comparatively high value, and the initiating element 50 opens to insert the energizing winding of the motor 30 and the winding 32 of the relay clutch in series with the secondary winding of the saturable current transformer 65. A force dependent in magnitude upon the line current is, accordingly, exerted on the armature 22, because of the magnetic action of the relay winding 7 in the magnetic circuit of the relay proper. If the line current exceeds the setting corresponding to the adjustment of the cam 14, the armature 22 moves to its operating position instantaneously, thereby establishing an energizing circuit for the trip coil 47, and causing the circuit breaker 46 to open.

If the value of over-current in the line circuit 45 does not exceed the instantaneous setting of the cam 14, the armature 22 does not immediately move to its operating position, and the motor 30 acts through the clutch 28 to drive the cam 14 in the proper direction to reduce the air gap between the cam 14 and the armature 22 (clockwise in Fig. 1). As the cam 14 rotates, the reluctance of the relay magnetic circuit gradually diminishes, and the force tending to operate the armature 22 progressively increases, assuming that the current in line 45 remains constant. When the operating force produced by the main relay coil 7 and its associated magnetic structure reaches a value slightly greater than the restraining force exerted by the permanent magnet 26, the armature 22 snaps to its operated position, thereby tripping the circuit breaker 46 in the manner described above.

It will be apparent that the operating characteristics of the relay depend upon the contour of the cam 14, the speed of the motor 30, and the initial position of the cam 14. By changing any or all of these factors, any desired over-current characteristic, both as to time and current values, can be secured. One desirable contour of the cam 14 is a spiral of such form as to produce straight line over-current characteristics, such as described in the United States patent of S. L. Goldsborough, No. 1,973,060, issued September 11, 1934, and assigned to the Westinghouse Electric & Manufacturing Company, and in the United States patent of R. M. Smith, No. 2,071,857, issued February 23, 1937, and assigned to the Westinghouse Electric & Manufacturing Company.

In some applications it is desirable to provide adjustment of the over-current setting in infinitely fine gradations over a wide range of current values. Such adjustment may be effected by utilizing the adjustable transformer 37, shown in Fig. 4, in connection with a suitable modification of the energizing circuits of Fig. 5. Such a modification is shown in Fig. 5a. It is believed that the operation of this arrangement will be obvious from that described above in connection with Figs. 1 to 5.

Referring to Figs. 6 to 8, an application of the invention as an impedance relay for general alternating-current application is shown therein. In this figure, the base plate 1, magnetic structure 2, relay coil 7, shaft 8 and armature 22 are similar to the corresponding elements of Figs. 1 to 3 and are designated by the same reference numerals. In place of the adjustable speed polarizing vibrator motor 30 of Figs. 1 to 3, however, a synchronous motor 55 is shown as a driving element for the shaft 8 and magnetic cam 14. It will be obvious that the vibrator motor 30 of Figs. 1 to 3 and the synchronous motor 55 of Fig. 6 serve the same purpose of producing timed movement of the cam 14 and may be used interchangeably, or may be replaced by functionally equivalent apparatus of entirely different form.

The synchronous motor 55 is preferably of the type in which the armature moves axially, when the coil is deenergized, to a position such that a pinion carried on the armature shaft is disengaged from a gear wheel associated therewith during operation of the motor. This feature is shown in Fig. 9.

Referring to Figs. 7 and 8, the synchronous motor 55 is connected by means of a gear train 57 to the shaft 8 for driving the magnetic cam 14. As the axial movement of the armature of the synchronous motor 55 serves to disconnect the cam 14 from the motor armature, the cam 14 may be restored to its initial position upon deenergization of the synchronous motor 5, without the use of an electromagnetic clutch, such as shown in Figs. 1 to 3.

In place of the helical spring 15 of Figs. 1 to 3, a flat spiral spring 56 is provided for rotating the cam 14 to its initial position. An adjustable stop, similar to that shown at 16 in Fig. 1, may be provided, but for simplicity has been omitted from Fig. 6.

In the impedance relay shown in Figs. 6 to 8, the armature 22 is restrained by means of an electromagnet 58, which serves a purpose similar to the permanent magnet 26 of Figs. 1 to 3, but provides a restraining force dependent upon the line voltage. One pole of the restraining magnet 58 may be provided with a lag loop 59, which serves to produce a quadrature flux, thereby avoiding zero points in the restraining force caused by zero points of circuit voltage.

The impedance relay shown in Figs. 6 to 8 is provided with an initiating element 50a, similar to the main magnetic armature 22, but located at a different angular position around the axis of rotation of the cam 14. In the embodiment shown, the initiating element 50a is located at approximately 130° from the main armature 22. Obviously, however, any number of similar movable armature elements may be disposed about the magnetic cam at various angular positions. It will be understood that the initiating element 50a serves the same purpose in initiating operation of the relay, as the separate initiating element 50 of Fig. 5.

Fig. 10 shows the electric circuits associated with the impedance relay of Figs. 6 to 8. In this figure, the power circuit 45, circuit breaker 46, trip coil 47, battery 48, line current transformer 49 and saturable transformer 65 are similar to corresponding elements of Fig. 5 and are designated by the same reference numerals. In addition to the line current transformer 49, a line potential transformer 60 is provided for obtaining the voltage variable necessary for application to the relay restraining magnets. The operation of the impedance relay circuits shown in Fig. 10 will be obvious from the operation described above in connection with the over-current relay shown in Figs. 1 to 5.

Referring to Figs. 11 and 12, an improved magnetic structure for the relay of Figs. 1 to 4 is shown therein. In place of the iron shell of Figs. 1 to 4, an outer magnetic circuit 70 of substantially rectangular form, having an inwardly projecting pole 71, is provided. The outer magnetic circuit 70 is preferably composed of flat laminations of silicon steel, and a similarly laminated cam 72, having the same function as the cam 14 of Fig. 1 is rotatably mounted within the magnetic circuit 70, in cooperative relationship with the pole 71.

A relay armature 73, preferably of silicon steel having channel form, is pivoted by any suitable means, indicated diagrammatically at 74, in a position to be attracted by the cam 72 when the latter is sufficiently energized. Magnetic energization is supplied by a coil 75, mounted on the pole 71 to serve the same purpose as the coil 7 of Fig. 2. In place of the permanent magnet restraining element 26 of Figs. 1 to 4, a small magnetically saturable stud 76 is provided in a position to engage the magnetic circuit 70 and the armature 73 when the latter is in its normal position. The stud 76 may be secured to either the armature 73 or the magnetic circuit 70 and preferably is made of a ferromagnetic nickel-iron alloy.

At low values of magnetomotive force acting in the relay magnetic circuit, the stud 76 carries a relatively large proportion of the flux acting upon the armature 73, and accordingly tends to restrain the latter. At much larger values of magnetomotive force, the flux carried by the stud 76 is limited because of magnetic saturation, and the operating force acting on the armature 23 exceeds the restraining force, causing the armature 73 to move to its tripping position. The circuits used are the same as those of Fig. 5, and the operation, except as explained above, is identical with that of the relay shown in Figs. 1 to 5.

The characteristics of the impedance relay of Figs. 6 to 10 may be modified in various ways, as mentioned in connection with the over-current form of the invention. By suitably designing the contour of the cam 14, straight line impedance-time curves of uniform slope may be secured, or various stepped characteristics consisting of sloping portions and portions parallel to or perpendicular to the time axis may be secured. Obviously, other desirable impedance-time characteristics may be secured. Reactance or other distance characteristics may be secured by modifying the phase relationship of current and voltage energization in well known manner.

I do not intend that the present invention shall be restricted to the specific structural details, arrangement of parts, or circuit connections herein set forth as various modifications thereof may be effected without departing from the spirit and scope of my invention. I desire, therefore, that only such limitations shall be imposed as are indicated in the appended claims.

I claim as my invention:

1. In a relay responsive to an over-current condition of an electric circuit, a magnetic operating member biased to an initial position and movable to an operating position, electromagnetic operating means for said member forming a magnetic circuit therewith, said electromagnetic operating means comprising a core portion energized in accordance with a current condition of said electric circuit and a rotatable portion included in said magnetic circuit, said rotatable portion having a graduated periphery arranged to vary the reluctance of said magnetic circuit, and timing means for controlling rotation of said rotatable portion.

2. In a relay responsive to an overcurrent condition of an electric circuit, a magnetic operating member movable from an initial position to an operating position, electromagnetic operating means for said member forming a magnetic circuit therewith and tending to move said member to said operating position, said electromagnetic operating means comprising a core portion energized in accordance with a current condition of said electric circuit and a rotatable portion of variable radius included in said magnetic circuit and arranged to vary the reluctance thereof, a permanent magnetic restraining element tending to hold said magnetic operating member in said initial position against the force exerted by said electromagnetic means, and a timing motor for rotating said rotatable portion.

3. In a relay responsive to an abnormal condition of an electric circuit, a plurality of magnetic operating members located at spaced positions, energizing means for said operating members including winding means energized from said electric circuit and including magnetic structure defining an individual air gap region for each of said operating members, said magnetic structure being designed to provide a variable characteristic for each of said operating members dependent upon the reluctance of the corresponding air gap region, a magnetic element having a graduated periphery, and means for moving said magnetic element through said air gap regions to thereby progressively vary the operating characteristics of said operating members.

4. In a relay responsive to an abnormal condition of an electric circuit, a plurality of magnetic operating members located at spaced positions substantially equidistant from a predetermined axis, energizing means for said operating members including winding means energized from said electric circuit and including magnetic structure defining an individual air gap region for each of said operating members, said magnetic structure being designed to provide a variable operating characteristic for each of said operating members dependent upon the reluctance of the corresponding air gap region, a magnetic cam element mounted for rotation on said axis to traverse said air gap regions, said cam element having a graduated periphery to progressively vary the operating characteristics of said operating members, and a motive device for rotating said cam element.

5. In a relay responsive to an abnormal condition of an electric circuit, a movable magnetic circuit element having a graduated periphery designed to provide non-uniform magnetic reluctance in a direction perpendicular to a predetermined path at a plurality of points on said path, a plurality of magnetic operating members located at spaced points adjacent said path and movable in response to forces perpendicular to said path, a common magnetizing means for producing a magnetomotive force dependent upon a condition derived from said electric circuit and acting in a magnetic circuit which includes said magnetic operating members in parallel relationship and which includes said magnetic circuit element, and motive means for moving said magnetic circuit element.

6. In a relay responsive to an abnormal condition of an electric circuit, a magnetic circuit element rotatable about an axis and having a graduated periphery designed to provide non-uniform magnetic reluctance in radial direction at a plurality of points on a circular path concentric with said axis, a plurality of magnetic operating members located at spaced points adjacent said circular path and movable in response to forces normal to said path, a common magnetizing means for producing a magnetomotive force dependent upon a condition derived from said electric circuit and acting in a magnetic circuit which includes said magnetic operating members in parallel relationship and which includes said magnetic circuit element, and a motor for rotating said magnetic circuit element.

7. In a relay responsive to an ohmic characteristic of an electric circuit, a plurality of magnetic operating members located at spaced positions, electromagnetic means energized in accordance with a current condition of said circuit for exerting operating forces on said members, electromagnetic means energized in accordance with a voltage condition of said circuit for exerting restraining forces on said members, one of said electromagnetic means including magnetic structure defining an individual air gap region for each of said operating members, said magnetic structure being designed to provide a variable characteristic for each of said operating members dependent upon the reluctance of the corresponding air gap region, a magnetic element having a graduated periphery, and means for moving said magnetic element through said air gap regions to thereby progressively vary the operating characteristics of said operating members.

8. In a relay responsive to an ohmic characteristic of an electric circuit, a plurality of magnetic operating members located at spaced positions, a common electromagnetic means energized in accordance with a current condition of said circuit for exerting operating forces on said members, individual electromagnetic means energized in accordance with voltage conditions of said circuit for exerting restraining forces on said members, said common electromagnetic means including magnetic structure defining an individual air gap region for each of said operating members, said magnetic structure being designed to provide a variable characteristic for each of said operating members dependent upon the reluctance of the corresponding air region, a magnetic element having a graduated periphery, and means for moving said magnetic element through said air gap regions to thereby progressively vary the operating characteristics of said operating members.

9. In a relay responsive to an ohmic characteristic of an electric circuit, a plurality of magnetic operating members located at spaced positions substantially equidistant from a predetermined axis, electromagnetic means energized in accordance with a current condition of said circuit for exerting operating forces on said members, electromagnetic means energized in accordance with a voltage condition of said circuit for exerting restraining forces on said members, said first-mentioned electromagnetic means including magnetic structure defining an individual air gap region for each of said operating members, said magnetic structure being designed so that the magnetic reluctance of said air gap regions normally prevents operation of the corresponding operating member, a magnetic cam element mounted for rotation on said axis to traverse said air gap regions, said cam element having a graduated periphery to progressively reduce the reluctance of said air gaps and a motive device for rotating said cam element.

WELTON V. JOHNSON.